United States Patent
Blott et al.

(10) Patent No.: US 10,482,129 B1
(45) Date of Patent: Nov. 19, 2019

(54) PIPELINED DATABASE PROCESSING CIRCUIT AND METHOD

(71) Applicant: Xilinx, Inc., San Jose, CA (US)

(72) Inventors: Michaela Blott, Malahide (IE); Ling Liu, Saggart (IE); Daniel Ziener, Eichenberg (DE); Kimon Karras, Athens (GR)

(73) Assignee: XILINX, INC., San Jose, CA (US)

( * ) Notice: Subject to any disclaimer, the term of this patent is extended or adjusted under 35 U.S.C. 154(b) by 291 days.

(21) Appl. No.: 15/484,455

(22) Filed: Apr. 11, 2017

(51) Int. Cl.
| | |
|---|---|
| *G06F 7/02* | (2006.01) |
| *G06F 16/00* | (2019.01) |
| *G06F 16/9038* | (2019.01) |
| *G06F 3/06* | (2006.01) |
| *G06F 16/93* | (2019.01) |
| *G06F 16/901* | (2019.01) |
| *G06F 16/903* | (2019.01) |

(52) U.S. Cl.
CPC ........ *G06F 16/9038* (2019.01); *G06F 3/0604* (2013.01); *G06F 3/0638* (2013.01); *G06F 3/0683* (2013.01); *G06F 16/9014* (2019.01); *G06F 16/90339* (2019.01); *G06F 16/93* (2019.01)

(58) Field of Classification Search
CPC .. G06F 16/24569; G06F 16/22; G06F 16/185; G06F 16/2255; G06F 16/137; G06F 16/9014; G06F 16/90339; G06F 12/1018; G06F 16/245; G06F 3/0604; H04L 45/7453

See application file for complete search history.

(56) References Cited

U.S. PATENT DOCUMENTS

| | | | |
|---|---|---|---|
| 9,323,457 B2 | 4/2016 | Blott et al. | |
| 9,804,976 B1* | 10/2017 | Stark | ........................ G06F 9/467 |
| 2015/0121034 A1* | 4/2015 | Steele, Jr. | ........... G06F 12/1018 |
| | | | 711/216 |
| 2015/0160862 A1 | 6/2015 | Blott et al. | |
| 2016/0099810 A1* | 4/2016 | Li | ........................ H04L 9/0894 |
| | | | 713/193 |
| 2016/0217835 A1 | 7/2016 | Blott et al. | |
| 2018/0375772 A1* | 12/2018 | Wickeraad | ........... G06F 16/9014 |

OTHER PUBLICATIONS

Specification and drawings for U.S. Appl. No. 13/683,720, filed Nov. 21, 2012, Blott et al.

(Continued)

*Primary Examiner* — Bruce M Moser
(74) *Attorney, Agent, or Firm* — LeRoy D. Maunu

(57) ABSTRACT

Disclosed approaches for accessing data involve determining in a first stage of a pipelined processing circuit, hash values from keys in a data access request and determining in a second stage of the pipelined processing circuit and from a hash table, addresses associated with the hash values. In a third stage of the pipelined processing circuit, data are read at the addresses in a memory arrangement, and in a fourth stage of the pipelined processing circuit a subset of the data read from the memory arrangement is selected according to a query in the data access request. In a fifth stage of the pipelined processing circuit, the subset of the data read from the memory arrangement is merged into response data.

20 Claims, 9 Drawing Sheets

(56) References Cited

OTHER PUBLICATIONS

Becher, Andreas et al., "Energy-Aware SQL Query Acceleration through FPGA-Based Dynamic Partial Reconfiguration," Proc. of the Conference on Field-Programmable Logic and Applications, Sep. 2, 2014, pp. 662-669, IEEE, Piscataway, New Jersey, USA.

Dennl, Christopher et al., "On-the-fly Composition of FPGA-Based SQL Query Accelerators Using a Partially Reconfigurable Module Library," Proc. of the 2012 IEEE 20th International Symposium on Field-Programmable Custom Computing Machines, Apr. 29, 2012, pp. 45-52, IEEE Computer Society, Washington, DC, USA.

Dennl, Christopher et al., "Accleration of SQL Restrictions and Aggregations through FPGA-based Dynamic Partial Reconfiguration," Proc. of the 2013 21st Annual International IEEE Symposium on Field-Programmable Custom Computing Machines, Apr. 30, 2013, pp. 25-28, IEEE, Piscataway, New Jersey, USA.

Ziener, D. et al., "FPGA-Based Dynamically Reconfigurable SQL Query Processing," ACM Transactions on Reconfigurable Technology and Systems (TRETS), Jul. 2016, pp. 1-24, vol. 9, No. 4, Article 25, ACM, New York, New York, USA.

BECHER, A. et al., "A Co-Design Approach for Accelerated SQL Query Processing via FPGA-Based Data Filtering," Proc. of the 2015 International Conference on Field-Programmable Technology, Dec. 7, 2015, pp. 1-4.

\* cited by examiner

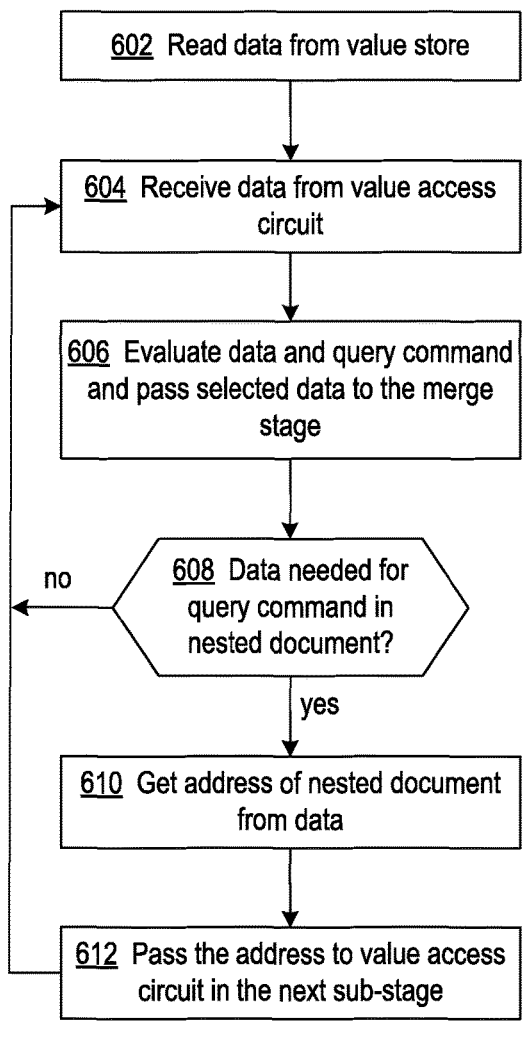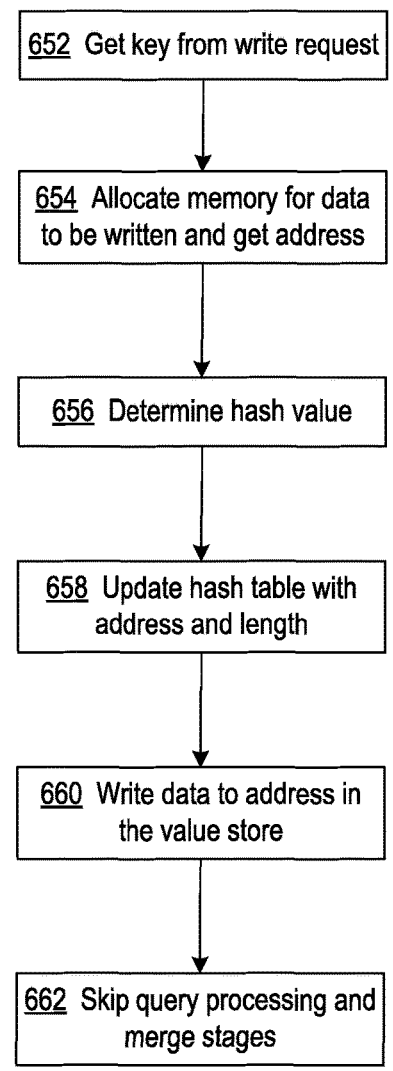
FIG. 11
FIG. 12

PIPELINED DATABASE PROCESSING CIRCUIT AND METHOD

TECHNICAL FIELD

The disclosure generally relates to circuits and methods for processing databases.

BACKGROUND

Ever-increasing quantities of data are stressing the storage and processing capabilities of data centers. System architects are increasingly deploying NoSQL databases to provide scalability for storage and processing. NoSQL databases differ from Structured Query Language (SQL) databases, which are generally relational databases that model data in a tabular format. NoSQL databases model data in a manner other than the tabular manner of relational databases. In some instances "No" in NoSQL refers to "non"-SQL databases, and in other instances "No" refers to "not only" SQL databases.

NoSQL databases use data structures such as a key-value, wide column, graph, or a document to organize data, making some operations faster in NoSQL than in relational databases. NoSQL databases offer advantages of reduced latency and increased throughput as compared to traditional relational databases. NoSQL databases that implement collections, documents and nested documents provide queries such as reductions and aggregations, which are more sophisticated than basic key-value database operations of get, set, delete, compare-and-swap, etc. Documents in NoSQL databases are often encoded in XML, YAML, and JSON as well as binary forms like BSON.

Though NoSQL databases offer advantages over relational databases, as databases grow in size, additional processor resources may be required to maintain a desired level of performance. With increases in storage and processor resources, power consumption will also grow.

SUMMARY

A query processing system described in the disclosure includes a first memory arrangement configured and arranged for storage of documents. A first-stage circuit of a pipelined processing circuit of the system is configured and arranged to receive a data access request and determine hash values from keys in a query in the data access request. A second memory arrangement of the system is configured and arranged for storage of addresses associated with hash values. A second-stage circuit of the pipelined processing circuit is coupled to the second memory arrangement and is coupled to receive the hash values from the first-stage circuit. The second-stage circuit is configured and arranged to determine from the second memory arrangement, addresses associated with the hash values. A third-stage circuit of the pipelined processing circuit is coupled to receive the addresses from the second-stage circuit and is configured and arranged to read data at the addresses from the first memory arrangement. A fourth-stage circuit of the pipelined processing circuit is coupled to receive the data read from the first memory arrangement and is configured and arranged to select a subset of the data read from the first memory arrangement according to the query. A fifth-stage circuit of the pipelined processing circuit is coupled to receive the subset of the data and is configured and arranged to merge the subset of the data into response data.

A disclosed method of accessing data includes determining in a first stage of a pipelined processing circuit, hash values from keys in a data access request and determining in a second stage of the pipelined processing circuit and from a hash table, addresses associated with the hash values. The method further includes reading in a third stage of the pipelined processing circuit, data at the addresses in a memory arrangement, and selecting in a fourth stage of the pipelined processing circuit a subset of the data read from the memory arrangement according to a query in the data access request. In a fifth stage of the pipelined processing circuit, the method merges the subset of the data read from the memory arrangement into response data.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 11 shows a flowchart of a process of processing a query of a collection of documents by the pipelined processing circuit shown in FIG. 7;

FIG. 12 shows a flowchart of a process performed by a pipelined processing circuit for writing document data to a value store.

DETAILED DESCRIPTION

Figure 1:
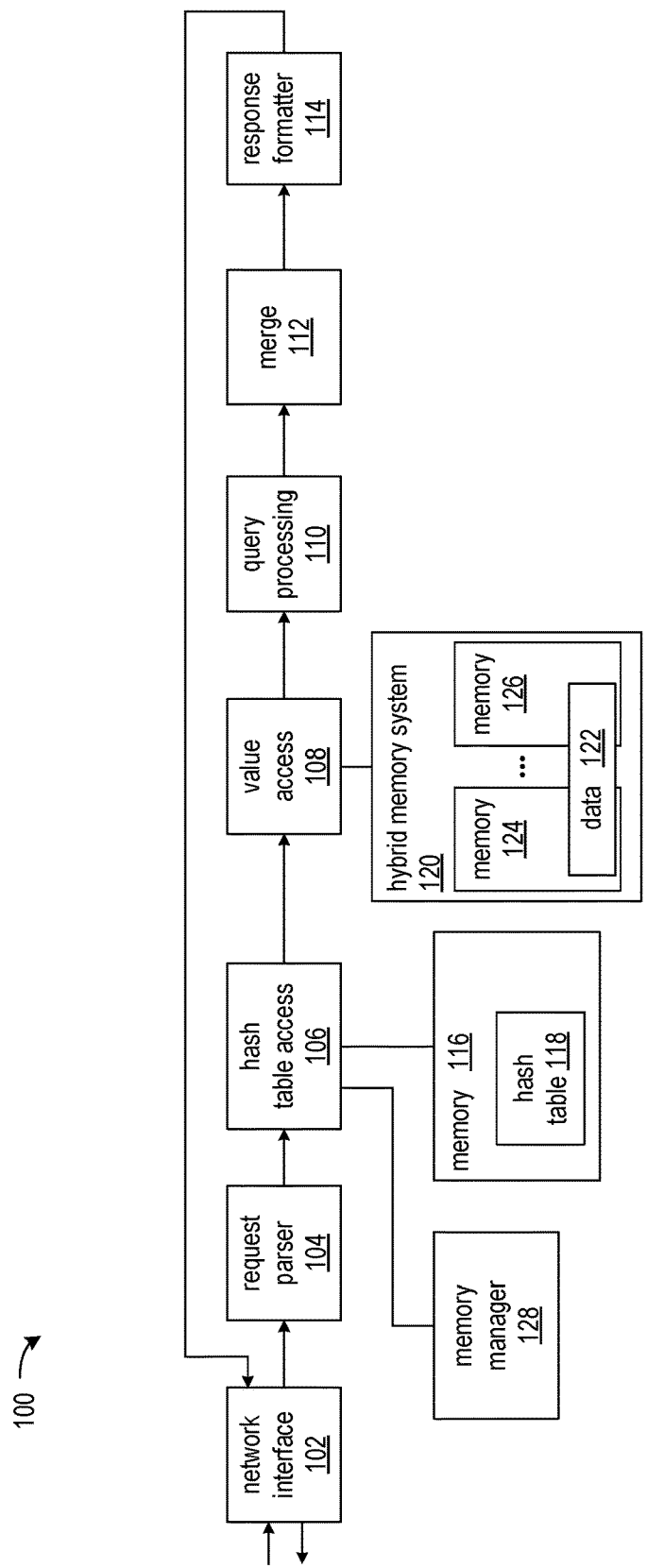
FIG. 1 shows a pipelined processing circuit 100 for processing queries against NoSQL data structures.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed systems and methods improve throughput and reduce latency and power consumption for queries against a NoSQL database having collections of documents. Some documents may include nested documents. Such NoSQL databases are sometimes referred to as document-oriented databases. A document-oriented database differs from a key-value store database, which is another type of NoSQL database, in that the structure of the data value in a key-value store is not needed to access data values in the database. The value data in a key-value store are amorphous in that the data have no concrete shape or form, whereas in a document store there are different document kinds, each following a specific format. Data values may be accessed with a simple look-up operation. In a document-oriented database the internal structure of a document controls extraction of desired information from the document. That is, the document structure is used in locating desired items of data. In an example implementation, the parts of a document may be referred to as fields. The fields in a document may be different data types, and in some applications a field may be, or reference, another document, which is referred to as a nested document. A collection is a set of documents designated as being related by the application.

The disclosed systems and methods provide improved processing circuitry for accessing the collections of documents, together with an improved memory arrangement and approaches for storing collections of documents. Alternative implementations are presented for storing collections of documents. In one approach, a memory region is allocated to store documents having the same structure/schema. Separate regions are allocated for different document structures. Pointers to collections, documents, and nested documents are stored in a hash table, which may optionally include keys and length information for collections, documents and nested documents.

In another implementation, a reference to a nested document may be stored in the parent document instead of in the hash table. The parent document is the document that contains the nested document. This implementation supports unlimited nesting of documents and collections. However, multiple dependent lookups may be required and may impact performance. In an alternative implementation, multiple hash tables may be paired with value stores on multiple memory channels, which may be time multiplexed. "Value store" is another term for a RAM. A first hash table-value store pair returns a collection, a second hash table-value store pair returns a document(s), and a third hash table-value store pair returns individual fields.

Alternative implementations are presented for query processing circuitry. The implementation of the query processing circuitry depends on the chosen memory arrangement and data structure for collections of documents. In one implementation, the pipelined, dataflow circuit of patent application Ser. No. 13/683,720, filed on Nov. 21, 2012, titled METHOD OF AND DEVICE FOR PROCESSING DATA USING A PIPELINE OF PROCESSING BLOCKS, having Michaela Blott et al. as inventors, and assigned to Xilinx, Inc., the assignee of the present application, may be adapted to include the circuitry disclosed in the present application. The entire contents of patent application Ser. No. 13/683,720 are incorporated by reference into the present application.

Command format and protocol support for document queries are included in a parser stage and in a response formatter stage of the pipelined, dataflow circuitry. In addition, metadata passed along stages of the pipeline includes the query command specified in a request. A memory manager handles allocation of memory areas for different document structures.

The pipelined, dataflow circuit further includes a hash calculation stage configured to compute hash values from keys specified in a query and extracted by the request parser, and to provide addresses associated with the keys to a value access stage. The keys may reference collections, documents, and/or fields. A value access stage is configured to read the referenced data according to the structure of the document. The data read by the value access stage is provided to a query processing stage. The query processing stage evaluates the data according to the query command extracted by the request parser stage and conveyed through the stages of the pipeline. For nested documents implicated by a query, in some implementations the query processing stage may initiate additional accesses by the value access stage.

Dependent lookups may be mapped to multiple memory channels and processed in a pipelined, dataflow circuit. The memory channels may be time-multiplexed onto the same interface in some implementations. A merge stage inputs data selected by the query processing stage and combines the selected data into a single data set for formatting by the response formatter stage.

FIG. 1 shows a pipelined processing circuit 100 for processing queries against NoSQL data structures. The pipelined processing circuit 100 includes a network interface 102 which receives input data, such as transaction requests received via transmission control protocol/internet protocol (TCP/IP) or user datagram protocol (UDP) over Ethernet. A request parser stage 104 receives the input data from the network interface 102 and determines which operations implemented in stages of the pipeline need to be enabled for each request. A request is also sometimes referred to as a "transaction." The set of operations that need to be enabled may be referred to as the "state" of a transaction, and meta-data is encoded to specify the transaction state. The meta-data may also include status information indicative of the results from the pipeline stages, such as the address of the requested data, length of data, data read from the value store, or a result of query processing. The meta-data is passed through the pipeline as the transaction is processed. The meta-data may also convey intermediate results between the stages of the pipeline. As the transaction flows through the pipeline, the basic operations are selectively executed or bypassed depending on the meta-data. The transaction state is also updated by a given stage of the pipeline circuit where necessary. The transaction state information can be communicated as a part of a header of a packet. Alternatively, the state information could be sent over a sub-channel in parallel with the packet The pipelined processing circuit 100 includes further stages for accessing NoSQL data structures, including a hash table access stage 106, a value access stage 108, a query processing stage 110, a merge stage 112, and a response formatter stage 114. A memory circuit 116 is coupled to the hash table access stage 106 and stores hash table 118, and a hybrid memory system 120 is coupled to the value access stage 108 for storage of NoSQL data 122 in memories 124 and 126. The NoSQL data may include document, nested documents, and other non-relational data structures. The memory manager circuit 128 manages allocation and deallocation of storage space in memories 116, 124, and 126. Memory 116 and hybrid memory system 120 are memory arrangements that include one or more RAM memory devices and memory controllers for reading from and writing to the memory devices.

In operation, the pipelined processing circuit 100 receives incoming requests through network interface 102. Packets received and formatted by the network interface according to an application-specific network protocol are then passed to the request parser 104, which determines the operations to be activated as the packet flows through the processing pipeline. The request parser includes logic for handling command format/protocol in requests (e.g., the MongoDB Wire protocol), and as the requests may include a query command, the request parser conveys the query command in the meta-data. A query command generally specifies search criteria that includes a combination of references to one or more keys in a document, Boolean and/or relational operators, and value(s) of the key(s).

The hash table access stage 106 maps a hash value, which is computed from a key specified in the query command, to a unique memory address within the hybrid memory system 120. The hash table access stage implements a hash function that maps all possible keys to an address/entry in the hash table 118. The entries in the hash table map to addresses in the hybrid memory system at which the keyed data may be accessed. The hash table access stage 106 outputs an address, which is input to the value access stage 108.

The value access stage 108 accesses the hybrid memory system 120 at the address provided by the hash table access stage 106. Accesses may entail reading data from or writing data to the specified address. The hybrid memory system 120 has memories 124 and 126 in which the NoSQL data is stored. In one implementation, memory 124 and 126 are different types of RAM. For example, memory 124 may be DRAM, and memory 126 may be NAND flash memory. Various aspects of a hybrid memory system are disclosed in patent application Ser. No. 14/607,978, filed on Jan. 28, 2015, titled CIRCUITS FOR AND METHODS OF CONTROLLING THE OPERATION OF A HYBRID MEMORY SYSTEM, having Michaela Blott et al. as inventors, and assigned to Xilinx, Inc., the assignee of the present application, and can be adapted to include the circuitry disclosed in the present application. The entire contents of patent application Ser. No. 14/607,978 are incorporated by reference into the present application. Also, aspects of a hybrid memory arrangement for use in a pipelined processing circuit are disclosed in U.S. Pat. No. 9,323,457, issued on Apr. 26, 2016, titled MEMORY ARRANGEMENT FOR IMPLEMENTATION OF HIGH-THROUGHPUT KEY-VALUE STORES, having Michaela Blott et al. as inventors, and assigned to Xilinx, Inc., the assignee of the present application, can be adapted to include the circuitry disclosed in the present application. The entire contents of U.S. Pat. No. 9,323,457 are incorporated by reference into the present application.

For a request involving reading data from the hybrid memory system 120, the value access stage 108 outputs the data, which is input by the query processing stage 110. For a request involving writing data to the hybrid memory system, the value access stage does not output data for processing by the query processing stage and the merge stage 112. Rather, the hash table access stage updates the hash table 118 and requests allocation of storage space for the data from the memory manager, and the value access stage stores data in the hybrid memory system at the address provided by the hash table access stage 106 and specifies in the meta-data that is passed along the pipeline circuit, a status indicator indicating success or failure of the write.

The query processing stage 110 processes the query command specified in the meta-data against data provided by the value access stage 108. In particular, the query processing stage determines whether or not the data from the value access stage satisfies criteria specified in the query command, which is included in the meta-data that accompanies the results from the value access stage. Data that satisfy the query command, which may be a subset of the data output by the value access stage, are output by the query processing stage and input by the merge stage 112. The merge stage merges data selected by the query processing stage into result data. For example, if multiple documents satisfy a query, selected data from the multiple documents may be output by the query processing stage and input to the merge stage.

The merge stage 112 aggregates multiple query processing results in a time-multiplexed fashion into a single data stream and outputs the merged data for input by response formatter stage 114. The response formatter includes logic for formatting the merged data according to application-specific protocol and formatting requirements. Formatted data is output by the response formatter stage and input by the network interface 102, which further formats the data according to network protocol requirements and returns the data and/or status information to the requester.

The connections between the stages 102, 104, 106, 108, 110, 112, and 114 of the pipelined processing circuit include first-in-first-out (FIFO) memory circuits, which may be represented as the lines connecting the stages of the pipeline circuit. The depth of the FIFO memory circuits may vary from a single entry to multiple entries, according to application requirements.

Figure 2:
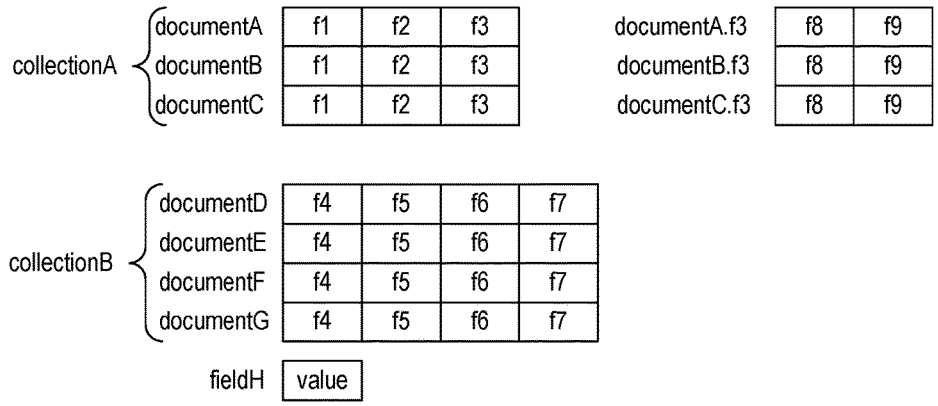
FIG. 2 shows an example of a set of data that may be accessible in a NoSQL database.

FIG. 2 shows an example of a set of data that may be accessible in a NoSQL database. The data include two collections of documents, collectionA and collectionB, along with a single field, fieldH. CollectionA includes documentA, documentB, and documentC, and collectionB includes documentD, documentE, documentF, and documentG.

Within each collection, the documents have the same data structure. Each of documentA, documentB, and documentC includes three fields, designated f1, f2, and f3. Each of documentD, documentE, documentF, and documentG includes four fields, designated f4, f5, f6, and f7. FieldH has an associated value. The fields in a document may be different types of data such as character, string, integer, real, Boolean, or another document. For example, field f3 of documentA, documentB, and documentC is a nested document. The key of nested document of documentA is "documentA.f3," the key of nested document of documentB is "documentB.f3," and the key of nested document of documentC is "documentC.f3."

Figure 3:
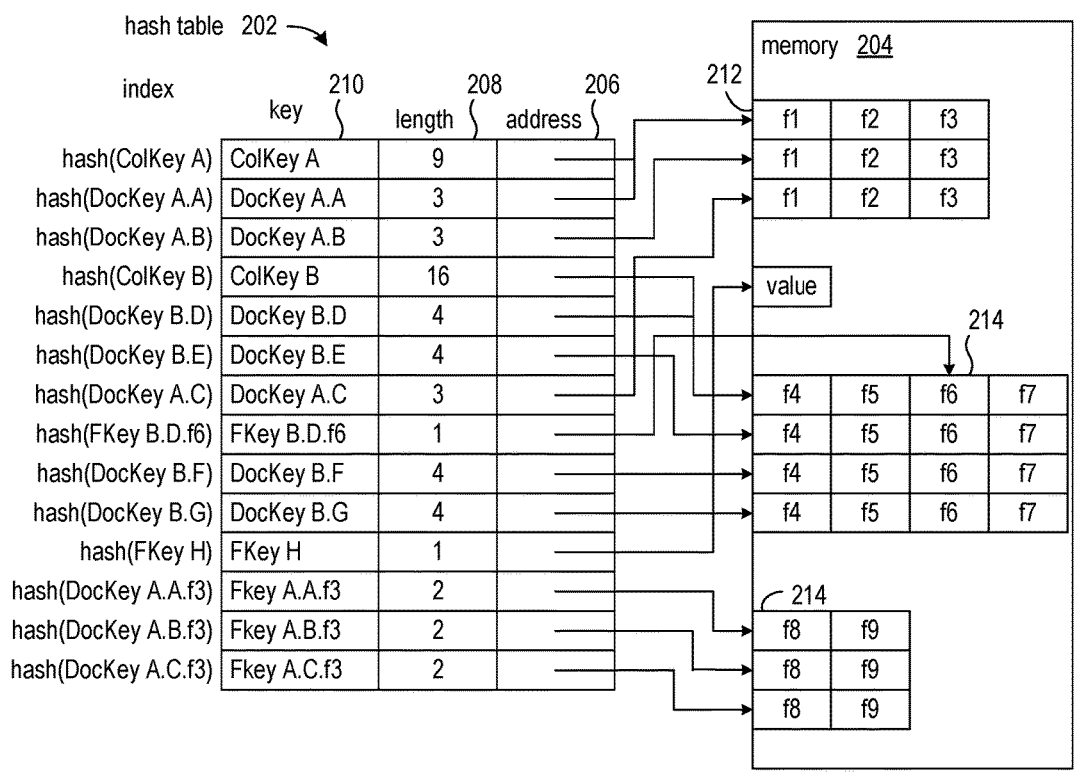
FIG. 3 shows an example of a hash table having entries that reference corresponding data in a memory according to the example collections of FIG. 2.

FIG. 3 shows an example of a hash table 202 having entries that reference corresponding data in a memory 204 according to the example collections of FIG. 2. Each collection is identified by a collection key, each document is identified by a document key, and individual fields may be identified by a field key. In the example, "ColKey A" identifies collection A, and "ColKey B" identifies collection B. "DocKey A.A" identifies document A in collection A, "DocKey A.B" identifies document B in collection A, etc. "FKey B.D.f6" identifies field f6 of document D in collection B. A field that is not part of a document, such as fieldH, has a key, "FKey H."

Each entry in the hash table 202 includes an address, a length, and optionally, the name of the key, or "key" for brevity. The addresses are shown in column 206, lengths are shown in column 208, and keys are shown in column 210. A hash function applied to a key produces an index to an entry in the hash table. For example, the index for the entry in the hash table having the address of the value of field f6 of document D of collection B is shown as hash (Fkey B.D.f6).

Each of the length values in column 208 specifies a quantity of memory associated with the key. For example, each block shown in the memory 204 may represent a word, and the quantity may indicate the number of words associated with the key. Collection A has a length of 9, which is the amount of memory allocated for documents A, B, and C. Similarly, collection B has a length of 16, which is the amount of memory allocated for documents D, E, F, and G.

The address mapped to a collection key is the address of the first document in the collection. For example, the address of collection A (key=ColKey A) as specified in the hash table references the first field of document A, which is shown as the block labeled f1 and indicated by reference number 212. The directional lines from the address entries in the hash table to the memory 204 represent the addresses of the memory referenced by the entries.

The address mapped to a document key is the address of the first field of the document. For example, the address of document A (key=DocKey A.A) as specified in the hash table references the first field of document A, which is shown as the block labeled f1 and indicated by reference number 212.

Addresses of individual fields may also be stored in the hash table. For example, the address of field f6 of document D of collection B (key=DocKey B.D.f6) as specified in the hash table references the address of the field, which is shown as block 214.

The hash table 202 may also store addresses of nested documents. In the example of FIG. 2, the documents in collectionA have nested documents in field f3. The hash values of the keys to the nested documents map to addresses of the nested documents in memory 204. That is, hash (DocKey A.A.f3) is mapped to the address of the first field f8 of documentA.f3, as shown by the directional line connected to block 214. The keys for documentB.f3 and document C.f3 are similarly mapped to addresses of field f8 of the documents.

Figure 4:
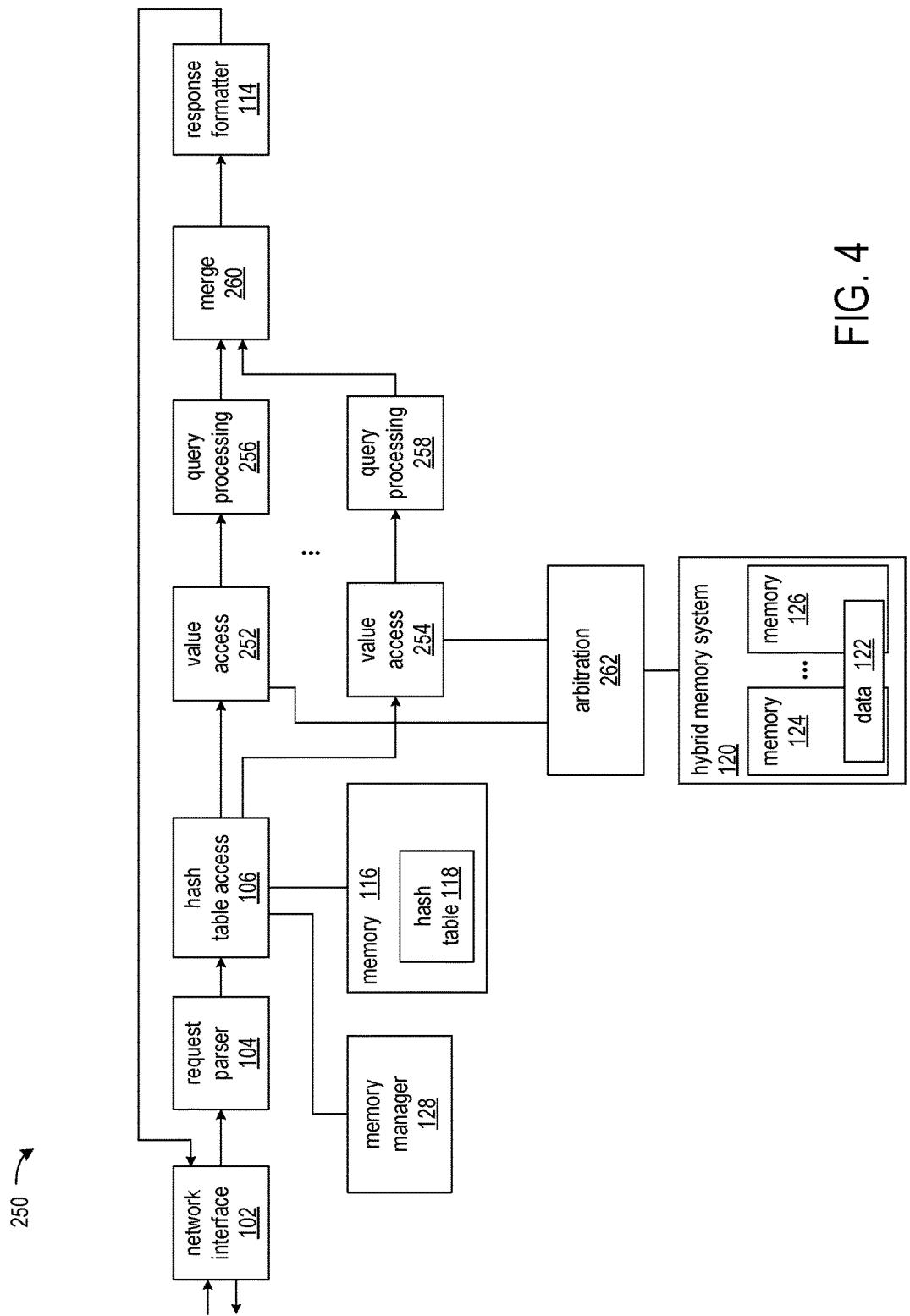
FIG. 4 shows a pipelined processing circuit for processing queries against NoSQL data structures in an implementation in which the value access stage has multiple parallel value access circuits, and the query processing stage has parallel query processing circuits.

FIG. 4 shows a pipelined processing circuit 250 for processing queries against NoSQL data structures in an implementation in which the value access stage has multiple parallel value access circuits, and the query processing stage has parallel query processing circuits. If the hash table 118 of FIG. 1 is implemented consistent with the example hash table 202 of FIG. 3, the hash table returns all references necessary to process a query command, multiple fields or documents or even collections in parallel. As explained above, the hash table of FIG. 3 includes entries for collections, documents, nested documents, and fields. If a query command references documentB of collection A and documentG of collectionB, then document B and document G may be processed in parallel by the multiple value access circuits and query processing circuits shown in FIG. 4.

The value access stage includes multiple parallel value access circuits, which are shown as value access circuits 252-254, and the query processing stage includes multiple query processing circuits, which are shown as query processing circuits 256-258. The merge stage 260 inputs query results from the query processing circuits 256-258. The multiple directional lines connecting the hash table access stage 106 to the value access circuits 252-254 represent multiple FIFO memory circuits. Similarly, the multiple directional lines connecting the value access circuits 252-254 to the query processing circuits 256-258 and connecting the query processing circuits 256-258 to the merge stage 260 represent multiple FIFO memory circuits.

A query command having multiple keys is input to the hash table access stage 106, and the hash table access stage accesses the hash table 118 to obtain the addresses that are mapped to the multiple keys. Each pair that includes an address and length is output to a respective one of the FIFO memory circuits for processing by a respective one of the value access circuits 252-254. The value access circuits are coupled to the hybrid memory system 120 through arbitration circuit 262.

In one implementation, the hybrid memory system 120 may include multiple physically separate memory channels for accessing memories 124-126, respectively. Separate memory channels permit memory access requests to be processed in parallel. For example, for a query command involving keys to documents and nested documents, the documents and nested documents may be stored on separate memory devices on separate memory channels. Separate storage permits a document and nested document to be read in parallel, thereby improving performance. The arbitration circuit 262 switches access requests to the channels having the referenced addresses, and if the referenced addresses are on the same channel, the access requests are processed in FIFO order. Each of the value access circuits 252-254 outputs data read from the hybrid memory system 120 to a respective one of the query processing circuits 256-258.

The parallel query processing circuits 256-258 collectively process the query command of the transaction, with each query processing circuit processing one part of the command. The request parser 104 analyzes the keys and operators specified in each query command. For parallel processing, the data referenced by multiple keys of the query command would be in separate memories on separate memory channels, and the query command would be divisible for separate evaluation of the operators. If the query command can be divided into multiple sub-commands, request parser stage 104 generates meta-data that indicates sub-commands. The hash table access stage 106 obtains the addresses mapped to the keys in each sub-command and passes to each of the value access circuits 252 a respective one of the sub-commands and the addresses for the keys of the sub-command. The sub-commands and associated data are output from the value access circuits 252-254, and the query processing circuits 256-258 input the sub-commands and associated data, respectively.

Each of the query processing circuits 256-258 outputs data according to processing of the sub-command on the data provided by the respective one of the value access circuits 252-254. The merge stage 260 inputs the data from the query processing circuits and merges the results into format suitable for the requester. The merge stage outputs the merged data, which is input by the response formatter stage 114. The response formatter stage formats the data and provides the data to the network interface 102 as described above.

Figure 5:
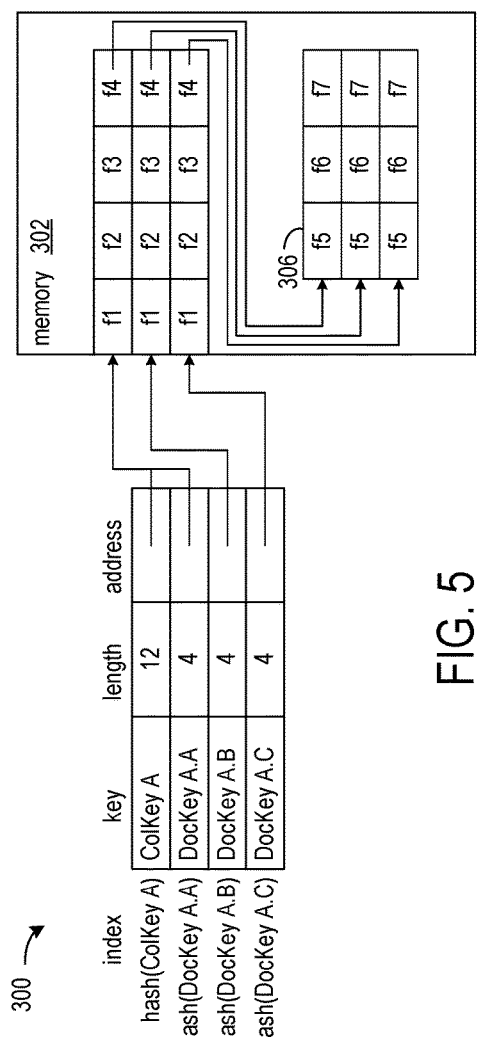
FIG. 5 shows an example of a hash table that references documents in a memory, and the references to nested documents are also stored in the memory.

In another implementation, addresses of nested documents may be stored in the value store instead of in the hash table as in FIG. 3. FIG. 5 shows an example of a hash table 300 that references documents in a memory 302, and the references to nested documents are also stored in the memory. In the example of FIG. 5, a collection A has documents A, B, and C. The collection key is ColKey A, and the document keys are DocKey A.A, DocKey B.A, and DocKey C.A. Each of the documents has four fields, f1, f2, f3, and f4, and f4 is a nested document. Specifically, each field f4 contains the address of the first field of the nested document. For example, field f4 of document A contains the address of field f5, which is shown as block 306, of the nested document.

Figure 6:
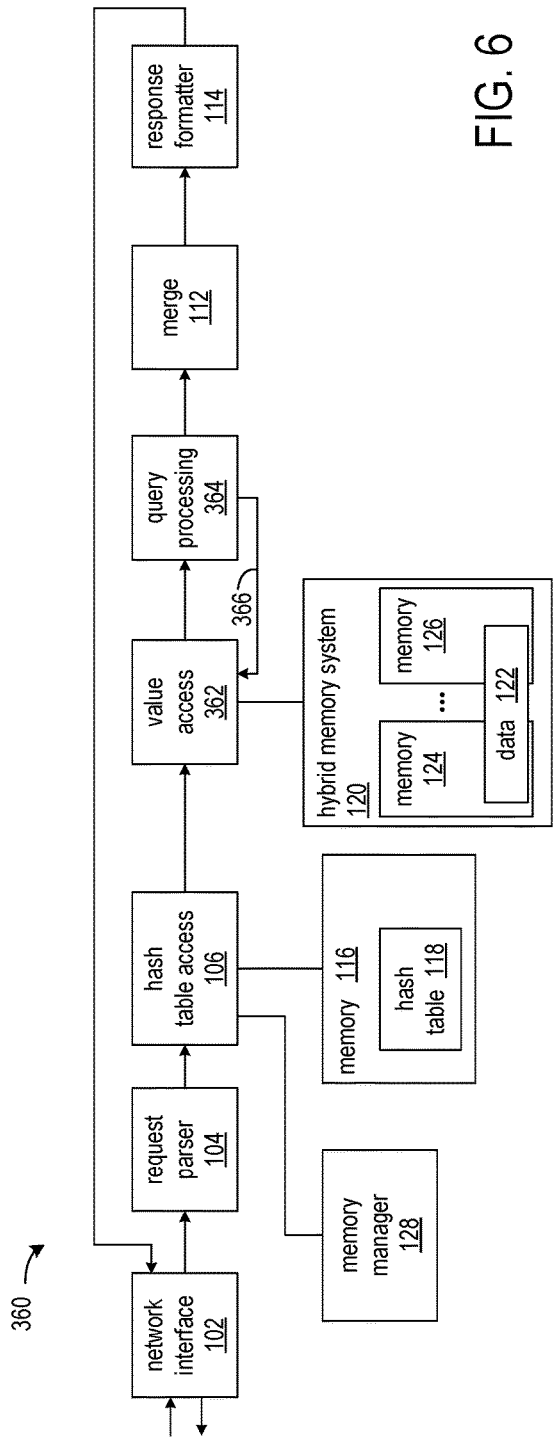
FIG. 6 shows a pipelined processing circuit for processing queries against NoSQL data structures in an implementation in which the hash table references documents in a memory, and the references to nested documents are also stored in the memory as shown in FIG. 5.

FIG. 6 shows a pipelined processing circuit 360 for processing queries against NoSQL data structures in an implementation in which the hash table references documents in a memory, and the references to nested documents are also stored in the memory as shown in FIG. 5.

The value access stage 362 reads data from the hybrid memory system 120 and outputs the data for processing by the query processing stage 364 as described above for FIG. 1. The value access stage 362 and query processing stage 364 differ from the value access stage 108 and query processing stage 110 of FIG. 1 in that the value access stage 362 and query processing stage 364 are configured to process nested documents in which the address of a nested document is contained within the parent document.

The value access stage 362 reads a document from the hybrid memory system 120 and outputs the document. The document, which contains a reference to a nested document, is input by the query processing circuit 364. If the nested document is needed for processing the query command, the query processing stage outputs the address of the nested document to the value access stage. Line 366 represents a FIFO memory circuit that buffers nested documents addresses from the query processing stage to the value access stage. The value access stage inputs the address of the nested document from the query processing stage, giving priority to reading the nested document over addresses from the hash access table stage 106. The nested document read by the value access stage is output to the query processing stage 364, which processes the nested document according to the query.

The FIFO memory circuit between the hash table access stage 106 and the value access stage 362 may be large enough to accommodate the value access stage and query processing stage 364 processing some application-specific number of levels of nested documents. Alternatively, a backpressure signal may be transmitted from the value access stage back to the hash table access stage, back to the request parser stage 104, and back to the network interface 102 to stop accepting new transactions until the query processing stage indicates that all the required levels of nested documents have been retrieved.

The merge stage 112 inputs the data from the query processing stage 364 and merges the results into format suitable for the requester. The merge stage outputs the merged data, which is input by the response formatter stage 114. The response formatter stage formats the data and provides the data to the network interface 102 as described above.

Figure 7:
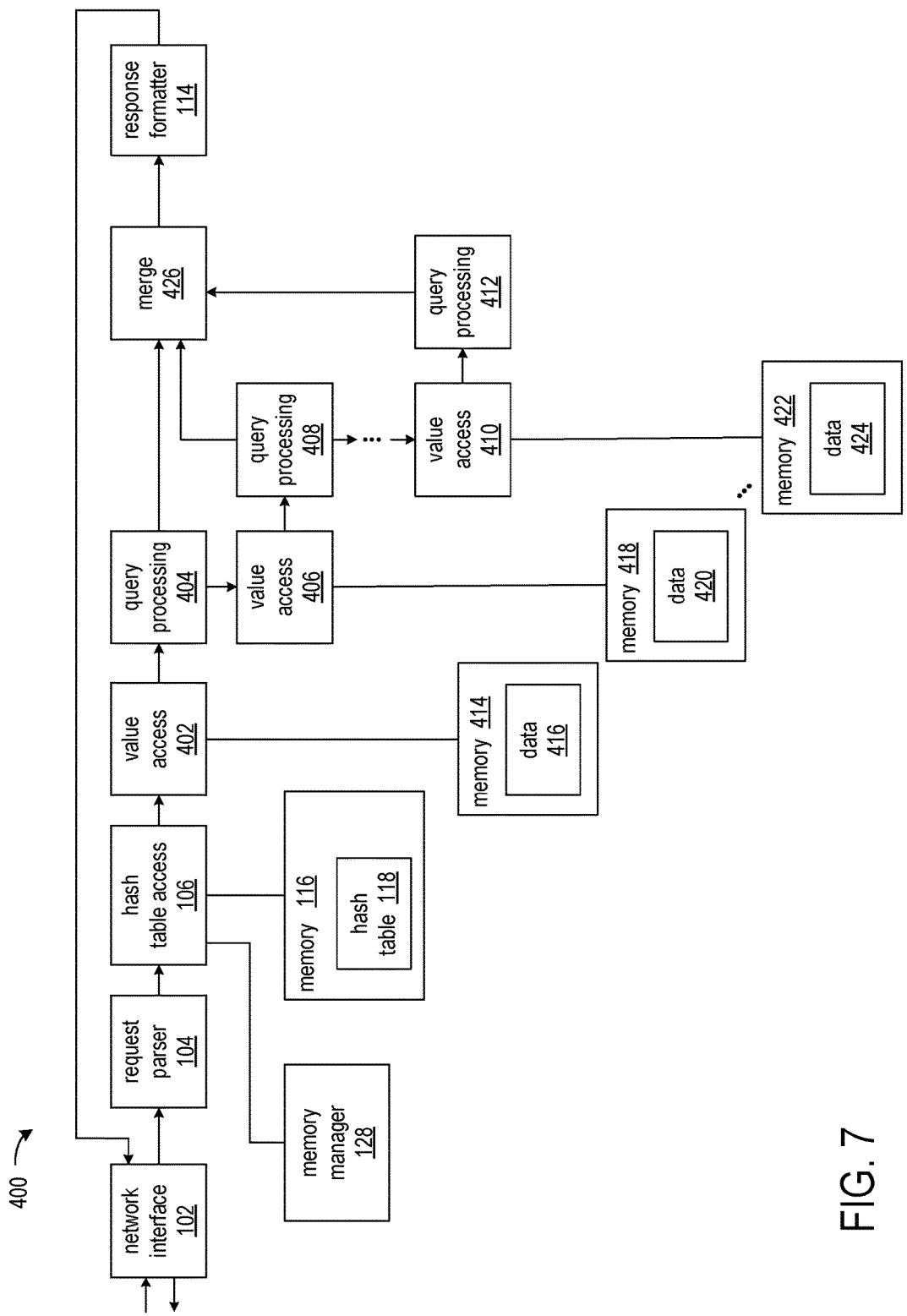
FIG. 7 shows an alternative pipelined processing circuit to the pipelined processing circuit of FIG. 6.

FIG. 7 shows an alternative pipelined processing circuit 400 to the pipelined processing circuit 360 of FIG. 6. Instead of the loop-back from query processing stage 364 to the value access stage 362 in the pipelined processing circuit 362, pipelined processing circuit 400 employs multiple, pipelined sub-stages for retrieving nested documents. Instances of value access circuits and query processing circuits combine to form multiple pipelined sub-stages. For example, value access circuit 402 and query processing circuit 404 form a first sub-stage, value access circuit 406 and query processing circuit 408 form a second sub-stage, . . . , and value access circuit 410 and query processing circuit 412 form an Nth sub-stage. Each sub-stage retrieves and performs query processing on one level of a document. FIFO memory circuits connect the value access circuit of a sub-stage to the query processing circuit in the sub-stage, and connect the query processing circuit of one sub-stage to the value access circuit in the next sub-stage.

Value access circuit 402 is coupled to the memory arrangement 414 and inputs an address provided by the hash table access stage 106. The value access circuit 402 reads the document, which is part of data 416 on the memory arrangement 414, and outputs the document. The query processing circuit 404 inputs the document and processes the document according to the query command. If the query command selects the nested document referenced by the document, the query processing circuit 404 reads the address from the input document and outputs the address to the value access circuit 406 in the next sub-stage.

Value access circuit 406 is coupled to the memory arrangement 418 and inputs the address provided by the query processing circuit 404. The value access circuit 406 reads the nested document, which is part of data 420 on the memory arrangement 418, and outputs the nested document. The query processing circuit 408 inputs the nested document and processes the nested document according to the query command. If the query command selects another nested document referenced by the nested document, the query processing circuit 408 reads the address from the input nested document and outputs the address to the value access circuit in the next sub-stage. Additional nested documents may be processed in additional sub-stages. Some maximum number of sub-stages may be implemented in the pipelined processing circuit 400 according to application needs. Value access circuit 410 and query processing circuit 412 form the last sub-stage. In some implementations, the last sub-stage may form a loopback as shown in the implementation of FIG. 6.

The memory arrangements 414, 418, and 422 may be coupled to the respective value access circuits 402, 406, and 410 via physically separate input/output channels in order to permit parallel access to the data 416, 420, and 424. Alternatively, the memory channels could be time-multiplexed on the same interface.

Each of the query processing circuits 404, 408, and 412 outputs data according to processing of the sub-command on the data provided by the respective one of the value access circuits 402, 406, and 410. The merge stage 426 inputs the data from the query processing circuits and merges the results into format suitable for the requester. The merge stage outputs the merged data, which is input by the response formatter stage 114. The response formatter stage formats the data and provides the data to the network interface 102 as described above.

Figure 8:
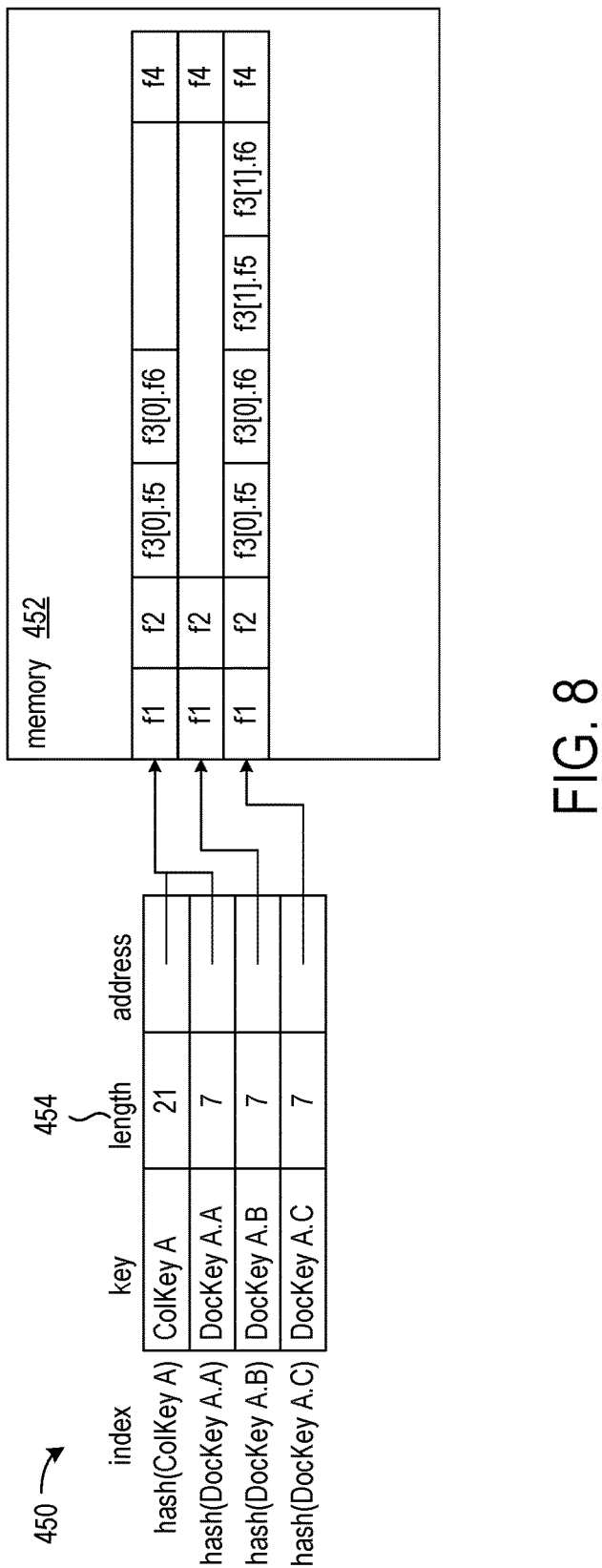
FIG. 8 shows an example of a hash table that references a collection of documents stored in a flat format in a memory.

In some implementations, the documents and nested documents are stored in a flat layout. That is, the nested document is stored contiguous with the parent document. FIG. 8 shows an example of a hash table 450 that references a collection of documents stored in a flat format in a memory 452.

The collection identified by ColKey A includes three documents, which are identified by DocKey A.A, DocKey A.B, and DocKey A.C. Each of the documents includes 4 fields, f1, f2, f3, and f4, and field f3 is list of nested documents. In document DocKey A.A, there is one nested document in the list of field f3, and the one nested document has two fields. The fields in the one nested document are identified by f3[0].f5 and f3[0].f6. The notation, "[0]" indicates the one nested document in the list of nested documents.

In document DocKey A.C, there are two nested documents in the list of field f3, and each of the nested documents has two fields. The fields in the first nested document are identified by f3[0].f5 and f3[0].f6, and the fields in the second nested document are identified by f3[1].f5 and f3[1].f6. The notation, "[0]" indicates the first nested document in the list, and the notation "[1]" indicates the second nested document in the list.

The values associated with the documents in the length column 454 indicate the size of the document and the maximum number of nested documents possible in the list of nested documents. Thus, the document identified by DocKey A.C, which has two nested documents, has a length of 7 as does the document identified by DocKey A. B, which has no nested documents.

The pipelined processing circuit 100 of FIG. 1 is suitable for processing queries of collections of documents stored in a flat format, such as the format shown in FIG. 8. As nested documents are stored with the parent documents in contiguous address space, both the parent document and the nested document may be retrieved by the value access stage 108 using the length of the document to control the quantity of data read from the value store.

Figure 9:
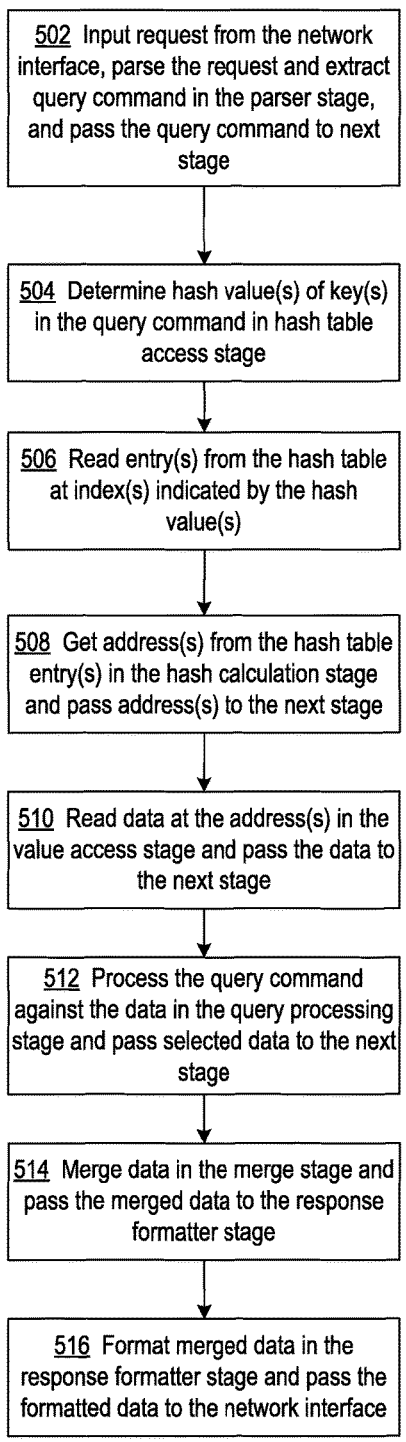
FIG. 9 shows a flowchart of a process of processing a query of a collection of documents by the pipelined processing circuits shown in FIGS. 1 and 4.

FIG. 9 shows a flowchart of a process of processing a query of a collection of documents by the pipelined processing circuits 100 and 250 shown in FIGS. 1 and 4. At block 502, the request parser stage of the pipelined processing circuit inputs a request from the network interface, parses the request and extracts the query command from the request. The request parser stage outputs the query command for processing by the hash table access stage. At block 504, the hash table access stage determines the hash value(s) of key(s) specified in the query command, and at block 506, the hash table access stage reads an entry(s) from the hash table as indexed by the hash value(s). Each entry read from the hash table includes an address and an associated length value. At block 508, the address(es) and length(s) are output from the hash table access stage for processing by the value access stage.

At block 510, the value access stage reads data from the value store at the address(s) output by the hash table access stage. The associated length value(s) indicates the quantity of data to read beginning at address. The value access stage outputs the data read from the value store for processing by the query processing stage.

At block 512, the query processing stage evaluates the query command and data from the value access stage. A subset of the data may be selected by the query processing stage and output for processing by the merge stage.

The merge stage at block 514 merges the data received from the query processing stage and provides the merged data to the response formatter stage.

At block 516, the data from the merge stage is formatted according to application-specific protocol and formatting requirements and output to the network interface for communication to the requester.

Figure 10:
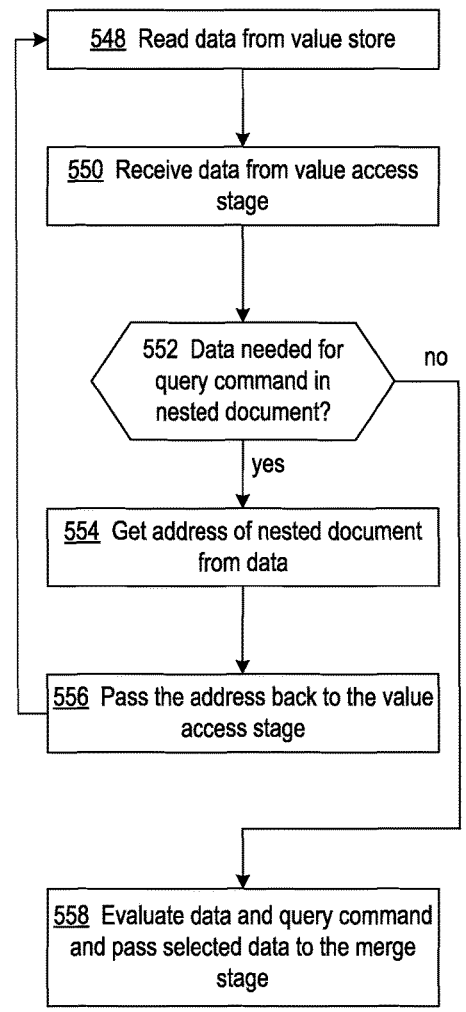
FIG. 10 shows a flowchart of a process of processing a query of a collection of documents by the pipelined processing circuit shown in FIG. 6.

FIG. 10 shows a flowchart of a process of processing a query of a collection of documents by the pipelined processing circuit 360 shown in FIG. 6. FIG. 10 does not repeat the processing described in blocks 502, 504, 506, 508, 514, and 516 of FIG. 9, because the processing performed by the pipelined processing circuit 360 shown in FIG. 6 for these blocks is similar to that performed by the pipelined processing circuit 100 of FIG. 1. The operations of FIG. 10 modify the operations shown at blocks 510 and 512 of FIG. 9 to accommodate an implementation in which the document read from the value store includes the address of a nested document.

At block 548, the value access stage reads document data from the value store at the address provided by the hash table access stage. The document data is output for processing by the query processing stage. At block 550, the query processing stage inputs document data retrieved by the value access stage, and at decision block 552 determines whether or not evaluation of the query command requires data from a nested document. If so, the process continues at block 554, at which the query processing stage obtains the address of the nested document from the input document data. At block 556, the query processing stage outputs the address of the nested document to the value access stage, and processing returns to block 548. In processing an address received from the query processing stage, at block 548 the value access stage gives priority to the address from the query processing stage over an address from the hash table access stage.

When the query processing stage determines at decision block 552 that data from a nested document is not needed for evaluation of the query command, control is directed to block 558. At block 558, the query processing stage evaluates the query command and document data and provides selected data to the merge stage as described above.

FIG. 11 shows a flowchart of a process of processing a query of a collection of documents by the pipelined processing circuit 400 shown in FIG. 7. FIG. 11 does not repeat the processing described in blocks 502, 504, 506, 508, 514, and 516 of FIG. 9, because the processing performed by the pipelined processing circuit 360 shown in FIG. 7 for these blocks is similar to that performed by the pipelined processing circuit 100 of FIG. 1. The operations of FIG. 11 modify the operations shown at blocks 510 and 512 of FIG. 9 to accommodate an implementation in which the document read from the value store includes the address of a nested document, and the pipelined processing circuit includes multiple sub-stages, and each sub-stage has an instance of a value access circuit and a query processing circuit. The process of FIG. 11 may be implemented on the value access circuit and query processing circuit in each sub-stage.

At block 602, the value access circuit of a sub-stage reads document data from the value store at the address provided by the hash table access stage if the sub-stage is the first sub-stage, or from the query processing circuit of a previous sub-stage if the sub-stage is not the first sub-stage. The document data is output by the value access circuit for processing by the query processing circuit of the sub-stage.

At block 604, the query processing circuit of the sub-stage inputs document data retrieved by the value access circuit, and at block 606 evaluates the query command and document data. Any document data that satisfies the query is selected and output to the merge stage as described above.

At decision block 608, the query processing circuit of the sub-stage determines whether or not evaluation of the query command requires data from a nested document. If so, at block 610 the query processing circuit obtains the address of the nested document from the input document data. At block 612, the query processing circuit outputs the address of the nested document to the value access circuit in the next sub-stage. The query processing circuit returns to block 604 to process the next document data received from the value access circuit in the sub-stage.

If the query processing circuit determines at decision block 608 that data from a nested document is not needed for evaluation of the query command, control is directed to block 604 to process the next document data received from the value access circuit in the sub-stage.

FIG. 12 shows a flowchart of a process performed by a pipelined processing circuit for writing document data to a value store. At block 652, the request parser stage recognizes a write command and reads from the input request the key of the document data to be written. The write command and key are output by the request parser stage as meta-data, and the hash table access stage inputs the meta-data.

At block 654, the hash table access stage signals the memory manager to allocate memory space for storage of the document data. The memory manager outputs to the hash table access stage, an address at which the document data is to be written. At block 656, the hash table access stage determines the hash value of the key passed in the meta-data. The hash value is an index into the hash table, and at block 658, the hash table access stage updates the entry in the hash table indexed by the hash value with the address provided by the memory manager and a length value indicating the quantity of document data to be written.

The hash table access stage outputs the address and length value, which are input by the value access stage. At block 660, the value access stage writes the document data to the value store at the address provided by the hash table access stage. The query processing stage and merge stage of the pipelined processing circuit are skipped at block 662 as no query processing is performed for a write request.

Figure 13:
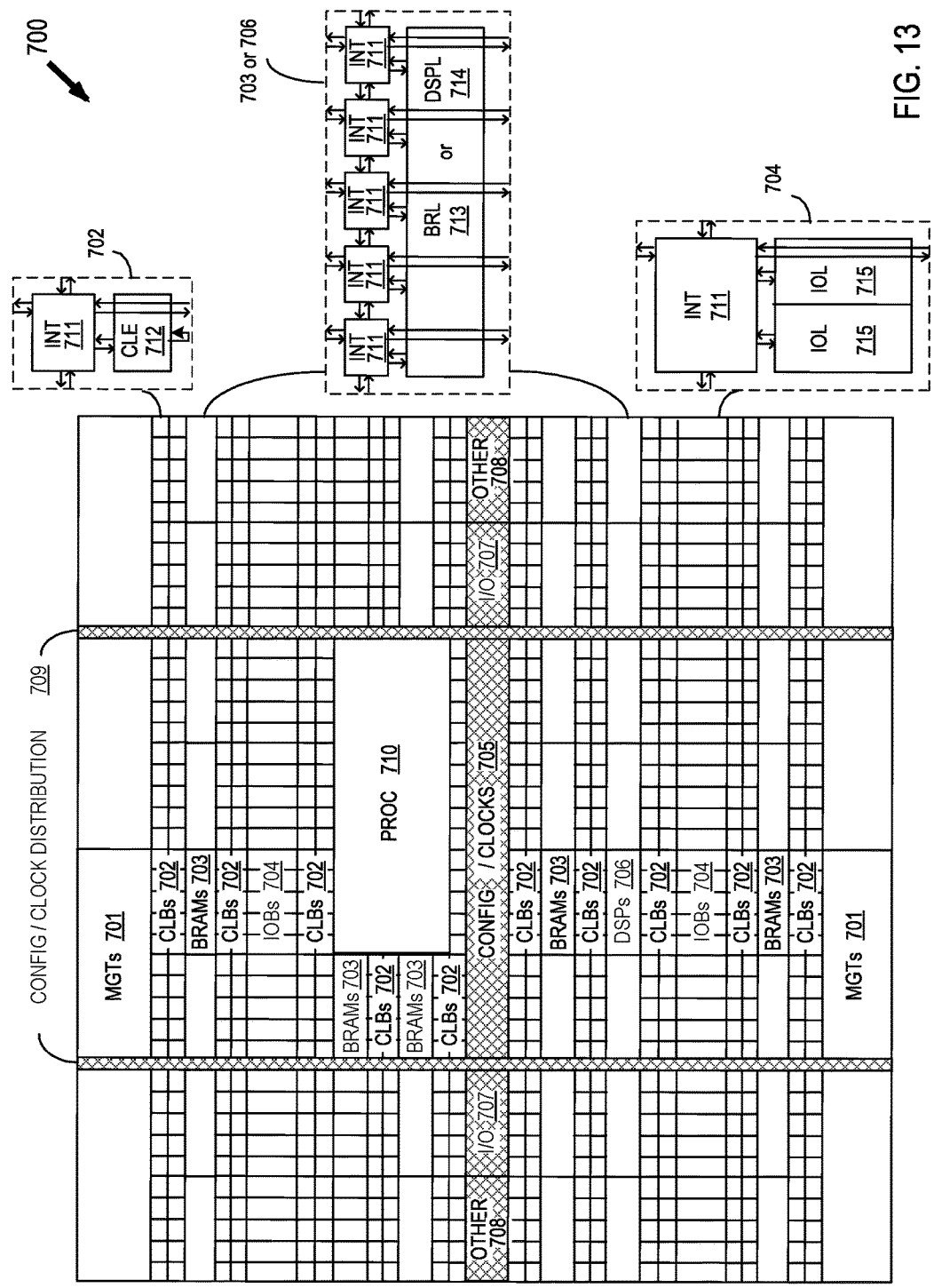
FIG. 13 shows a programmable integrated circuit (IC) on which the disclosed circuits and processes may be implemented.

FIG. 13 shows a programmable integrated circuit (IC) 700 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 13 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 13.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile.

In the pictured embodiment, a BRAM tile has the same height as five CLBs, but other numbers (e.g., four) can also be used. A DSP tile 706 can include a DSP logic element (DSPL) 714 in addition to an appropriate number of programmable interconnect elements. An IOB 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

In the pictured embodiment, a columnar area near the center of the die (shown shaded in FIG. 13) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 13 include additional logic blocks that disrupt the regular columnar structure making up a large part of the programmable IC. The additional logic blocks can be programmable blocks and/or dedicated logic. For example, the processor block PROC 710 shown in FIG. 13 spans several columns of CLBs and BRAMs.

Note that FIG. 13 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 13 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The disclosed methods and system are thought to be applicable to a variety of systems for accessing NoSQL databases. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A query processing system, comprising:
   a first memory arrangement configured and arranged for storage of documents;
   a first-stage circuit of a pipelined processing circuit configured and arranged to receive a data access request and determine hash values from keys in a query in the data access request;
   a second memory arrangement configured and arranged for storage of document addresses associated with a plurality of hash values;
   a second-stage circuit of the pipelined processing circuit coupled to the second memory arrangement and coupled to receive the determined hash values from the first-stage circuit and configured and arranged to determine from the second memory arrangement, ones of the document addresses associated with the determined hash values;

a third-stage circuit of the pipelined processing circuit coupled to receive the ones of the document addresses from the second-stage circuit and configured and arranged to read data of respective documents at the ones of the document addresses from the first memory arrangement;

a fourth-stage circuit of the pipelined processing circuit coupled to receive the data of the respective documents read from the first memory arrangement and configured and arranged to select a subset of the data of the respective documents according to the query, wherein the query specifies search criteria, and the subset of the data is selected in response to satisfaction of the search criteria by data of the respective documents; and a fifth-stage circuit of the pipelined processing circuit coupled to receive the subset of the data and configured and arranged to merge the subset of the data of the respective documents into response data.

2. The system of claim 1, wherein:
the data of the respective documents read from the first memory arrangement include data of a first document and an address in the first memory arrangement of a nested document of the first document;
the fourth-stage circuit is further configured and arranged to provide the address of the nested document to the third-stage circuit; and
the third-stage circuit is further configured and arranged to receive the address of the nested document from the fourth-stage circuit and read the nested document from the first memory arrangement.

3. The system of claim 1, wherein:
the data of the respective documents read from the first memory arrangement include data of a first document;
the second memory arrangement is further configured and arranged for storage of:
  a key for the first document and an associated first address of the first document in the first memory arrangement; and
  a key for a nested document of the first document and an associated second address of the nested document in the first memory arrangement; and
the second-stage circuit is further configured and arranged to determine the first address associated with the key for the first document and determine the second address associated with the key for the nested document, and provide the first address and the second address to the third-stage circuit; and
the third-stage circuit is further configured and arranged to read the first document and the nested document from the first memory arrangement.

4. The system of claim 1, wherein:
the first memory arrangement is further configured and arranged for storage of a first document and a nested document at contiguous addresses; and
the third-stage circuit is further configured and arranged to read the first document and the nested document from the contiguous addresses.

5. The system of claim 1, wherein:
the data of the respective documents read from the first memory arrangement include data of a first document;
the second memory arrangement is configured and arranged for storage of:
  a key for the first document and an associated first address of the first document in the first memory arrangement; and
  a key for a nested document of the first document and an associated second address of the nested document in the first memory arrangement; and
the second-stage circuit is further configured and arranged to determine the first address associated with the key for the first document and determine the second address associated with the key for the nested document;
the third-stage circuit is further configured and arranged to read the first document and the nested document from the first memory arrangement; and
the fourth-stage circuit is further configured and arranged to evaluate data of the first document in parallel with evaluation of data of the nested document according to the query in the data access request.

6. The system of claim 5, wherein:
the first memory arrangement includes a first memory device on a first memory channel and a second memory device on a second memory channel; and
the third-stage circuit is further configured and arranged to read the first document from the first memory device in parallel with reading the nested document from the second memory device.

7. The system of claim 1, wherein:
a first instance of the third-stage circuit and a first instance of the fourth-stage circuit form a first sub-stage of the pipelined processing circuit;
a second instance of the third-stage circuit and a second instance of the fourth-stage circuit form a second sub-stage of the pipelined processing circuit;
the first instance of the third-stage circuit is configured to read the data from the first memory arrangement, and the data of the respective documents read from the first memory arrangement include data of a first document and an address in the first memory arrangement of a nested document of the first document;
the first instance of the fourth-stage circuit is configured to select the address of the nested document from the first document in response to the query in the data access request and to provide the address of the nested document to the second instance of the third-stage circuit;
the second instance of the third-stage circuit is configured to read the nested document from the first memory arrangement and to provide the nested document to the second instance of the fourth-stage circuit; and
the second instance of the fourth-stage circuit is configured and arranged to process the nested document according to the query in the data access request.

8. The system of claim 7, wherein:
the first memory arrangement includes a first memory device on a first memory channel and a second memory device on a second memory channel; and
the third-stage circuit is further configured and arranged to read the first document and the address of the nested document from the first memory device;
the second sub-stage is further configured and arranged to read the nested document from the second memory device.

9. The system of claim 1, wherein:
the first memory arrangement includes a first memory device on a first memory channel and a second memory device on a second memory channel; and the third-stage circuit is further configured and arranged to read a first document from the first memory device in parallel with reading a second document from the second memory device.

10. The system of claim 9, wherein:
the data read from the first memory arrangement include a first document and an address in the first memory arrangement of a nested document of the first document;
the fourth-stage circuit is further configured and arranged to provide the address of the nested document to the third-stage circuit; and
the third-stage circuit is further configured and arranged to receive the address of the nested document from the fourth-stage circuit and read the nested document from the first memory arrangement.

11. A method of accessing data, comprising:
determining in a first stage of a pipelined processing circuit, hash values from keys in a data access request;
determining in a second stage of the pipelined processing circuit and from a hash table, addresses associated with the hash values;
reading in a third stage of the pipelined processing circuit, data of respective documents at the addresses in a memory arrangement;
selecting in a fourth stage of the pipelined processing circuit a subset of the data read from the memory arrangement according to a query in the data access request, wherein the query specifies search criteria, and the subset of data read from the first memory arrangement is selected in response to satisfaction of the search criteria by data of the respective documents; and
merging in a fifth stage of the pipelined processing circuit, the subset of the data of the respective documents read from the memory arrangement into response data.

12. The method of claim 11, wherein the data read from the memory arrangement include a first document and an address in the memory arrangement of a nested document of the first document, and the reading includes reading from the memory arrangement the nested document at the address of the nested document.

13. The method of claim 11, wherein:
the data read from the memory arrangement includes a first document;
the hash table includes:
a key for the first document and an associated address of the first document in the first memory arrangement; and
a key for a nested document of the first document and an associated address of the nested document in the memory arrangement; and
the determining in the second stage includes determining the address associated with the key for the first document and determining the address associated with the key for the nested document; and
the reading includes reading the first document and the nested document from the memory arrangement.

14. The method of claim 11, wherein:
the reading includes reading a first document and a nested document contiguously stored in the memory arrangement.

15. The method of claim 11, wherein:
the data read from the memory arrangement includes a first document;
the hash table includes:
a key for the first document and an associated address of the first document in the memory arrangement; and
a key for a nested document of the first document and an associated address of the nested document in the memory arrangement; and
the determining in the second stage includes determining the address associated with the key for the first document and determining the address associated with the key for the nested document;
the reading includes reading the first document and the nested document from the memory arrangement; and
the selecting includes evaluating data of the first document in parallel with evaluating data of the nested document according to the query in the data access request.

16. The method of claim 15, wherein the reading includes reading the first document from a first memory device of the memory arrangement in parallel with reading the nested document from a second memory device of the memory arrangement.

17. The method of claim 11, wherein:
the data read from the memory arrangement include a first document and an address in the memory arrangement of a nested document of the first document;
the fourth stage of the pipelined processing circuit includes a first sub-stage and a second sub-stage;
the selecting includes:
selecting in the first sub-stage, the first document according to the query in the data access request;
reading in the first sub-stage, the nested document from the memory arrangement; and
selecting in the second sub-stage the nested document according to the query in the data access request.

18. The method of claim 17, wherein:
the reading of the data in the third stage includes reading the first document and the address of the nested document from a first memory device on a first memory channel of the memory arrangement; and
the reading of the nested document in the first sub-stage includes reading the nested document from a second memory device on a second memory channel of the memory arrangement.

19. The method of claim 11, wherein the reading includes reading a first document from a first memory device of the memory arrangement in parallel with a second document from a second memory device of the memory arrangement.

20. The method of claim 19, wherein the data read from the memory arrangement include a first document and an address in the memory arrangement of a nested document of the first document, and the reading includes reading from the memory arrangement the nested document at the address of the nested document.

* * * * *